United States Patent
Goshima et al.

(10) Patent No.: US 11,326,053 B2
(45) Date of Patent: May 10, 2022

(54) FLAME-RETARDANT POLYBUTYLENE TEREPHTHALATE RESIN COMPOSITION

(71) Applicant: POLYPLASTICS CO., LTD., Tokyo (JP)

(72) Inventors: Kazuya Goshima, Fuji (JP); Itsuki Saito, Fuji (JP)

(73) Assignee: POLYPLASTICS CO., LTD., Tokyo (JP)

(*) Notice: Subject to any disclaimer, the term of this patent is extended or adjusted under 35 U.S.C. 154(b) by 0 days.

(21) Appl. No.: 16/981,861

(22) PCT Filed: Mar. 20, 2019

(86) PCT No.: PCT/JP2019/011671
§ 371 (c)(1),
(2) Date: Sep. 17, 2020

(87) PCT Pub. No.: WO2019/182006
PCT Pub. Date: Sep. 26, 2019

(65) Prior Publication Data
US 2021/0047511 A1    Feb. 18, 2021

(30) Foreign Application Priority Data

Mar. 22, 2018  (JP) .................. JP2018-054166

(51) Int. Cl.
| C08L 67/03 | (2006.01) |
| C08L 67/02 | (2006.01) |
| C09K 21/14 | (2006.01) |

(52) U.S. Cl.
CPC .............. *C08L 67/02* (2013.01); *C09K 21/14* (2013.01); *C08L 2201/02* (2013.01)

(58) Field of Classification Search
CPC ........ C08K 5/02; C08K 3/016; C08K 5/0066; C08G 18/4213; C09K 21/00; C08L 67/02
See application file for complete search history.

(56) References Cited

U.S. PATENT DOCUMENTS

| 4,128,709 | A | 12/1978 | Vollkommer et al. | |
| 4,211,730 | A * | 7/1980 | Vollkommer | C08L 69/00 526/219.6 |
| 6,028,156 | A | 2/2000 | Peled et al. | |
| 6,180,251 | B1 | 1/2001 | Kanai et al. | |
| 7,125,923 | B2 | 10/2006 | Geprags | |
| 8,921,465 | B2 | 12/2014 | Hirakawa et al. | |
| 2009/0166576 | A1* | 7/2009 | Miyamoto | C08L 67/02 252/62 |
| 2012/0232200 | A1* | 9/2012 | Ohtake | C08K 5/29 524/195 |
| 2014/0252265 | A1 | 9/2014 | Gabriel et al. | |
| 2015/0259440 | A1 | 9/2015 | Croitoru et al. | |
| 2015/0314495 | A1 | 11/2015 | Immel et al. | |
| 2015/0368459 | A1 | 12/2015 | Yamanaka et al. | |
| 2019/0010325 | A1 | 1/2019 | Yamanaka et al. | |
| 2021/0047511 | A1 | 2/2021 | Goshima et al. | |

FOREIGN PATENT DOCUMENTS

| CN | 105669885 A | 6/2016 |
| EP | 3 348 616 A1 | 7/2018 |
| EP | 3 770 217 A1 | 1/2021 |
| GB | 2 018 750 A | 10/1979 |
| JP | 2001-261948 A | 9/2001 |
| JP | 2004-91584 A | 3/2004 |
| JP | 2004-277718 A | 10/2004 |
| JP | 2008-156381 A | 7/2008 |
| JP | 2012-201857 A | 10/2012 |
| JP | 2013-57009 A | 3/2013 |
| JP | 2015-212381 A | 11/2015 |
| JP | 2015-532350 A | 11/2015 |
| WO | 2011/148796 A1 | 12/2011 |
| WO | 2015/162609 A1 | 10/2015 |
| WO | 2017/043334 A1 | 3/2017 |
| WO | 2020/100727 A1 | 5/2020 |

OTHER PUBLICATIONS

International Search Report dated Jun. 18, 2019, issued in counterpart International Application No. PCT/JP2019/011671 (1 page).
Notice of Reasons for Refusal dated Nov. 26, 2019, issued in counterpart JP Patent Application No. 2019-559377, w/English translation (4 pages).
Decision to Grant a Patent dated Mar. 3, 2020, issued in counterpart JP Patent Application No. 2019-559377, w/English translation (5 pages).
Extended (Supplementary) European Search Report dated Apr. 23, 2021, issued in counterpart EP Application No. 19771376.1. (7 pages).
International Search Report dated Nov. 20, 2018, issued in application No. PCT/JP2018/030792. (counterpart to U.S. Appl. No. 16/640,430)(2 pages).
Extended (Supplementary) European Search Report dated Apr. 29, 2021, issued in EP Application No. 18848706.0. (counterpart to U.S. Appl. No. 16/640,430)(8 pages).
Non-Final Office Action dated Jun. 24, 2021, issued in U.S. Appl. No. 16/640,430 (17 pages).
Final Office Action dated Jan. 26, 2022, issued in U.S. Appl. No. 16/640,430 (15 pages).
Office Action dated Dec. 1, 2021, issued in counterpart CN application No. 201980020178.3, with English translation. (12 pages).
Chapter 15 High Performance Liquid Chromatography, Instrumental analysis, pp. 429-432, with English translation. (8 pages).
Zhao, et al., "Application Manual of coating process", Sinopec Press, 2003, pp. 315-316, with English translation. (23 pages).
Youk, et al., "Polymerization of Ethylene Terephthalate Cyclic Oligomers with Antimony Trioxide" Macromolecules, 2000, vol. 33, No. 10, pp. 3594-3599. (6 pages).

(Continued)

*Primary Examiner* — Gregory Listvoyb
(74) *Attorney, Agent, or Firm* — WHDA, LLP

(57) ABSTRACT

The present invention addresses the problem of enhancing the fluidity of a polybutylene terephthalate resin composition that uses a halogenated benzyl acrylate-based flame retardant as a flame retardant while maintaining properties such as excellent mechanical strength that a polybutylene terephthalate-based resin possesses. The problem is solved by adding a protic compound to the polybutylene terephthalate resin composition that uses a halogenated benzyl acrylate-based flame retardant as a flame retardant.

6 Claims, 1 Drawing Sheet

(56) References Cited

OTHER PUBLICATIONS

Samperi, et al., "Thermal degradation of poly (butylene terephthalate) at the processing temperature", 2004, vol. 83, No. 1, pp. 11-17. (7 pages).
Peebles, et al., Isolation and identification of the linear and cyclic oligomers of poly (ethylene terephthalate) and the mechanism of cyclic oligomer formation, Journal of Polymer Science Part A-1, 1969, vol. 7, pp. 479-496. (18 pages).

* cited by examiner

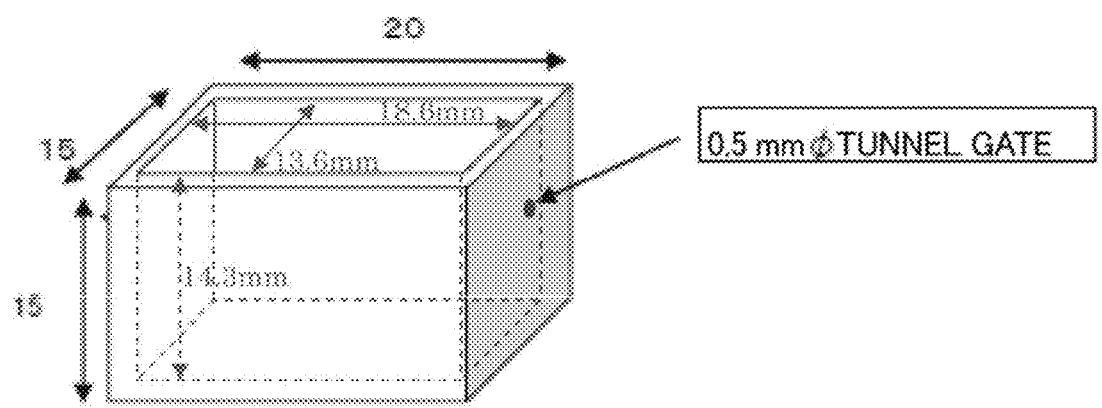

FLAME-RETARDANT POLYBUTYLENE TEREPHTHALATE RESIN COMPOSITION

TECHNICAL FIELD

The present invention pertains to a flame-retardant polybutylene terephthalate resin composition.

BACKGROUND ART

Polybutylene terephthalate resins (PBT resins) have various excellent electrical properties and are therefore widely used as engineering plastics in many applications such as electrical/electronic components. In these applications, flame retardance is demanded of the materials used in order to prevent ignition by tracking and the like. Polybutylene terephthalate resins themselves do not have sufficient flame retardance and are therefore used as flame-retardant resin compositions in which a flame retardant has been added.

Patent Document 1 introduces polypentabromobenzyl acrylate (PBBPA) as a halogenated benzyl acrylate-based flame retardant, which is one kind of flame retardant added to polybutylene terephthalate resins.

Meanwhile, in order to enhance the fluidity of polybutylene terephthalate resins, Patent Document 2 introduces adding a chain polyester oligomer. However, the objective thereof is to cause the chain polyester oligomer to react with a glycidyl group-containing elastomer.

Moreover, in order to improve melt fluidity while maintaining properties such as excellent mechanical strength that polybutylene terephthalate-based resins possess, Patent Document 3 introduces adding a cyclic polyester oligomer.

Furthermore, Patent Document 4 describes adding an oligomer to a polybutylene terephthalate-based resin. However, there is no mention of whether the added oligomer is a chain or cyclic oligomer and only polymers are used in the examples.

CITATION LIST

Patent Literature

Patent Document 1: JP 2015-532350 A
Patent Document 2: JP 2012-201857 A
Patent Document 3: JP 2008-156381 A
Patent Document 4: JP 2001-261948 A

SUMMARY OF INVENTION

Technical Problem

The present invention addresses the problem of enhancing the fluidity of a polybutylene terephthalate resin composition that uses a halogenated benzyl acrylate-based flame retardant as a flame retardant while maintaining properties such as excellent mechanical strength that the polybutylene terephthalate-based resin possesses.

Solution to Problem in the process of research addressing the problem of enhancing the fluidity of polybutylene terephthalate resin compositions that use a halogenated benzyl acrylate-based flame retardant as a flame retardant, the present inventors found that the problem can be solved by adding a protic compound, completing the present invention.

That is, the present invention pertains to (1)-(13) below.
(1) A flame-retardant polybutylene terephthalate resin composition containing a polybutylene terephthalate resin and a halogenated benzyl acrylate-based flame retardant in which the content of a protic compound as measured by headspace gas chromatography (180° C., 1 hour heating) is 10-1,000 ppm.
(2) The flame-retardant polybutylene terephthalate resin composition described in (1), wherein the polybutylene terephthalate resin contains 50-1,000 ppm of a linear low-molecular weight-body.
(3) The flame-retardant polybutylene terephthalate resin composition described in (1) or (2), wherein the protic compound is derived from a polymerization solvent of the halogenated benzyl acrylate-based flame retardant.
(4) The flame-retardant polybutylene terephthalate resin composition described in any one of (1) to (3), wherein the protic compound is an alkoxy alcohol.
(5) The flame-retardant polybutylene terephthalate resin composition described in any one of (1) to (4), wherein the protic compound is a $C_1$-$C_{20}$ alkoxy $C_1$-$C_{20}$ alcohol.
(6) The flame-retardant polybutylene terephthalate resin composition described in any one of (1) to (5), wherein the protic compound is methoxyethanol.
(7) The flame-retardant polybutylene terephthalate resin composition described in any one of (1) to (4), wherein the protic compound is a $C_1$-$C_{20}$ dialkoxy $C_1$-$C_{20}$ alcohol.
(8) The flame-retardant polybutylene terephthalate resin composition described in (7), wherein the protic compound is 3,3-diethoxypropanol.
(9) The flame-retardant polybutylene terephthalate resin composition described in (1) or (2), wherein the protic compound is derived from a raw material of the halogenated benzyl acrylate-based flame retardant.
(10) The flame-retardant polybutylene terephthalate resin composition described in (9), wherein the protic compound is an aromatic carboxylic acid.
(11) The flame-retardant polybutylene terephthalate resin composition described in (10), wherein the protic compound is benzoic acid.
(12) The flame-retardant polybutylene terephthalate resin composition described in any one of (1) to (11), wherein the halogenated benzyl acrylate-based flame retardant is a brominated acrylic polymer represented by general formula (I)

[Chem. 1]

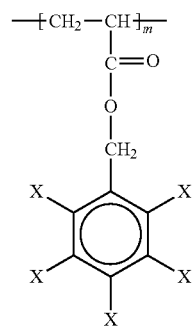

(in the formula, at least one X is bromine and m is a number from 10-2,000)
(13) The flame-retardant polybutylene terephthalate resin composition described in (12), wherein the halogenated benzyl acrylate-based flame retardant is polypentabromobenzyl acrylate.

Effects of Invention

According to the present invention, fluidity can be enhanced by adding a protic compound to a polybutylene terephthalate resin composition that uses a halogenated benzyl acrylate-based flame retardant as a fame retardant.

BRIEF DESCRIPTION OF DRAWINGS

FIG. 1 A FIGURE illustrating an example of a molded article used when measuring the melt fluidity of the present invention.

DESCRIPTION OF EMBODIMENTS

An embodiment of the present invention shall be explained in detail below. The present invention is not limited by the following embodiment and can be carried out with the addition of appropriate modifications so long as the effects of the present invention are not hindered.

[Flame-Retardant Polybutylene Terephthalate Resin Composition]

Below, the details of the components of the flame-retardant polybutylene terephthalate resin composition of the present embodiment shall be explained with examples.

(Polybutylene Terephthalate Resins)

Polybutylene terephthalate resins (PBT resins) are obtained by condensation polymerizing a dicarboxylic acid component comprising at least terephthalic acid or an ester-forming derivative thereof (a $C_{1-6}$ alkylester, an acid halide, etc.) and a glycol component comprising an alkylene glycol with a carbon number of at least 4 (1,4-butanediol) or an ester-forming derivative thereof (an acetylate, etc.). In the present embodiment, the polybutylene terephthalate resin is not limited to homopolybutylene terephthalate resins and may be a copolymer containing 60 mol % or more of butylene terephthalate units.

The amount of terminal carboxyl groups of the polybutylene terephthalate resin is not particularly limited so long as the objective of the present invention is not hindered but is preferably 30 meq/kg or less and more preferably 25 meq/kg or less.

The intrinsic viscosity of the polybutylene terephthalate resin is not particularly limited so long as the objective of the present invention is not hindered, but is preferably 0.60 dL/g or more and 1.20 dL/g or less and more preferably 0.65 dL/g or more and 0.90 dL/g or less. When a polybutylene terephthalate resin with an intrinsic viscosity in such a range is used, the obtained polybutylene terephthalate resin composition has particularly excellent moldability. Further, the intrinsic viscosity can be adjusted by blending polybutylene terephthalate resins having different intrinsic viscosities. For example, by blending a polybutylene terephthalate resin having an intrinsic viscosity of 1.00 dL/g with a polybutylene terephthalate resin having an intrinsic viscosity of 0.70 dL/g, a polybutylene terephthalate resin having an intrinsic viscosity of 0.90 dL/g can be prepared. The intrinsic viscosity of the polybutylene terephthalate resin can be measured under conditions of, for example, a temperature of 35° C. in o-chlorophenol.

In preparing the polybutylene terephthalate resin, when using an aromatic dicarboxylic acid other than terephthalic acid or an ester-forming derivative thereof as a comonomer component, for example, a $C_{8-14}$ aromatic dicarboxylic acid such as isophthalic acid, phthalic acid, 2,6-naphthalenedicarboxylic acid, or 4,4'-dicarboxydiphenylether, a $C_{4-16}$ alkanedicarboxylic acid such as succinic acid, adipic acid, azelaic acid, or sebacic acid; a $C_{5-10}$ cycloakanedicarboxylic acid such as cyclohexanedicarboxylic acid; or an ester-forming derivative of these dicarboxylic acid components (a $C_{1-6}$ alkylester derivative, an acid halide, etc.) can be used. These dicarboxylic acid components may be used alone or in a combination of two or more.

Among these dicarboxylic acid components, a $C_{6-12}$ aromatic dicarboxylic acid such as isophthalic acid and a $C_{4-12}$ alkanedicarboxylic acid such as adipic acid, azelaic acid, or sebacic acid are more preferred.

In preparing the polybutylene terephthalate resin, when using a glycol component other than 1,4-butanediol as a comonomer component, for example, a $C_{2-10}$ alkylene glycol such as ethylene glycol, propylene glycol, trimethylene glycol, 1,3-butylene glycol, hexamethylene glycol, neopentyl glycol, or 1,3-octanediol; a polyoxyalkylene glycol such as diethylene glycol, triethylene glycol, or dipropylene glycol; an alicyclic diol such as cyclohexanedimethanol or hydrogenated bisphenol A; an aromatic dial such as bisphenol A or 4,4'-dihydroxybiphenyl; a $C_{2-4}$ alkylene oxide adduct of bisphenol A such as an ethylene oxide 2-mol adduct of bisphenol A or a propylene oxide 3-mol adduct of bisphenol A; or an ester-forming derivative of these glycols (an acetylate, etc.) can be used. These glycol components may be used alone or in a combination of two or more.

Among these glycol components, a $C_2$ alkylene glycol such as ethylene glycol or trimethylene glycol, a polyoxyalkylene glycol such as diethylene glycol, an alicyclic diol such as cyclohexanedimethanol, etc. is more preferred.

As comonomer components that can be used beyond the dicarboxylic acid component and the glycol component, there are, for example, aromatic hydroxycarboxylic acids such as 4-hydroxybenzoic acid, 3-hydroxybenzoic acid, 6-hydroxy-2-naphthoic acid, and 4-carboxy-4'-hydroxybiphenyl; aliphatic hydroxycarboxylic acids such as glycolic acid and hydroxycaproic acid; $C_{3-12}$ lactones such as propiolactones, butyrolactones, valerolactones, and caprolactones (ε-caprolactone, etc.); and ester-forming derivatives of these comonomer components ($C_{1-6}$ alkylester derivatives, acid halides, acetylates, etc.).

The content of the polybutylene terephthalate resin is preferably 30-90% by mass of the total mass of the resin composition, more preferably 40-80% by mass, and still more preferably 50-70% by mass.

(Halogenated Benzyl Acrylate-Based Flame Retardant)

As examples of the halogenated benzyl acrylate-based flame retardant used in the present invention, there are brominated acrylic polymers represented by general formula (I) below.

[Chem. 2]

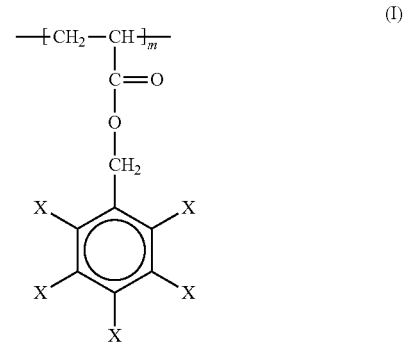

At least one X in the formula is bromine. The number of X is from 1 to 5 in one constituent unit, but in view of the flame retarding effects, 3-5 is preferred. The average degree of polymerization m is 10-2,000 and preferably in the range of 15-1,000. Thermal stability worsens in flame retardants in which the average degree of polymerization is low and the moldability of the polybutylene terephthalate resin worsens if a flame retardant in which the average degree of polymerization exceeds 2,000 is added thereto. Further, one of the above brominated acrylic polymers or a mixture of two or more may be used.

The halogenated benzyl acrylate-based flame retardant used in the present invention can contain, other than the brominated acrylic polymers above, which are flame retardants themselves, halogenated aromatic compounds derived from the solvent when polymerizing or from degradation products of the brominated acrylic polymer as impurities, but the content of halogenated aromatic compounds other than the flame retardant, which are such impurities, is preferably 100 ppm or less, more preferably 50 ppm or less, still more preferably 30 ppm or less, and especially preferably 10 ppm or less. The content of halogenated aromatic compounds other than the flame retardant can be determined from, for example, the amount of gas derived from halogenated aromatic compounds when measuring, with a gas chromatograph, the gas generated when a sample in which the halogenated benzyl acrylate-based flame retardant has been crushed is heat-treated in headspace.

The brominated acrylic polymer represented by general formula (I) is obtained by polymerizing, alone, a benzyl acrylate containing bromine, but benzyl methacrylates, etc. with similar structures may be copolymerized. As bromine-containing benzyl acrylates, there are pentabromobenzyl acrylate, tetrabromobenzyl acrylate, tribromobenzyl acrylate, and mixtures thereof. Among these, pentabromobenzyl acrylate is preferred. Moreover, as benzyl methacrylates that are copolymerizable components, there are methacrylates corresponding to the abovementioned acrylates. Furthermore, copolymerization with vinyl-based monomers is possible and examples include acrylic acid esters such as acrylic acid, methyl acrylate, ethyl acrylate, butyl acrylate, and benzyl acrylate, methacrylic acid esters such as methacrylic acid, methyl methacrylate, ethyl methacrylate, butyl methacrylate, and benzyl methacrylate, styrene, acrylonitrile, unsaturated carboxylic acids such as fumaric acid and maleic acid or anhydrides thereof, vinyl acetate, vinyl chloride, etc. Moreover, crosslinkable vinyl-based monomers, xylylene diacrylate, xylylene dimethacrylate, tetrabromoxylylene diacrylate, tetrabromoxylylene dimethacrylate, butadiene, isoprene, divinylbenzene, etc. can also be used. These are used in a molar amount equivalent to or less than and preferably 0.5 times the molar amount or less than that of the benzylacrylate or benzyl methacrylate.

Showing an example of the manufacturing method for the brominated acrylic polymer, there is the method of reacting brominated acrylic monomers at a predetermined degree of polymerization by liquid polymerization or bulk polymerization. In the case of liquid polymerization, it is preferable that a halogenated aromatic compound such as halogenated benzene or chlorobenzene not be used as the solvent. Further, an aprotic solvent such as ethylene glycol monomethyl ether, methyl ether ketone, ethylene glycol dimethyl ether, or dioxane is preferred as the solvent in the case of liquid polymerization. However, as will be discussed later, because a substance comprising a protic compound is set as the resin composition in the present invention, a substance comprising a protic compound can be used as the polymerization solvent.

The abovementioned brominated acrylic polymer is preferably washed in water and/or an aqueous solution containing alkali (earth) metal ions in order to remove reaction byproducts such as residual sodium polyacrylate. The aqueous solution containing alkali (earth) metal ions is easily obtained by putting an alkali (earth) metal salt in water, but a hydroxide which is an alkali (earth) metal that does not comprise chloride ions, phosphate ions, etc. (for example, calcium hydroxide) is optimum. When using, for example, calcium hydroxide as the alkali (earth) metal salt, generally about 0.126 g of calcium hydroxide is soluble in 100 g of water at 20° C. and the concentration of the aqueous solution is not particularly specified as far as the solubility allows. Further, the technique for washing with water and/or the aqueous solution containing alkali (earth) metal ions is not particularly limited and may be a technique such as that for immersing the brominated acrylic polymer in water and/or the aqueous solution containing alkali (earth) metal ions for an appropriate period of time. In the brominated acrylic polymer after the washing process with water and/or the aqueous solution containing alkali (earth) metal ions is complete, the dry solid content in the warm water extraction generally becomes 100 ppm or less and when using such a brominated acrylic polymer, the emergence of foreign matter on the surfaces of molded articles thereof is largely eliminated.

The content of halogenated aromatic compounds other than the flame retardant, which are the aforementioned impurities, in the flame-retardant polybutylene terephthalate resin composition of the present invention is preferably less than 0.5 ppm, more preferably 0.3 ppm or less, and yet more preferably 0.1 ppm or less. Due to the content of halogenated aromatic compounds other than the flame retardant in the flame-retardant polybutylene terephthalate resin composition being in the above range, corrosion of metal terminals in insert-molded articles using the polybutylene terephthalate resin composition can be suppressed. The content of such halogenated aromatic compounds other than the flame retardant can be determined from, for example, the amount of gas derived from halogenated aromatic compounds when measuring, with a gas chromatograph, the gas generated when a sample in which the polybutylene terephthalate resin composition has been crushed is heat-treated in headspace.

In making the resin flame-retardant, use together with an antimony-based flame retardant promoter is preferred. As representative flame retardant promoters, there are antimony trioxide, antimony tetroxide, antimony pentoxide, sodium pyroantimonate, etc. Furthermore, with the objective of preventing the spread of fire due to the resin dripping when burnt, use together with a drip prevention agent such as polytetrafluoroethylene is preferred.

The range of addition of the brominated acrylic polymer and the antimony-based flame retardant promoter to the resin is preferably 3-30 parts by mass of the polymer and 1-20 parts by mass of the antimony-based flame retardant promoter with respect to 100 parts by mass of the polybutylene terephthalate resin. If the added amounts of the brominated acrylic polymer and the antimony-based flame retardant promoter are too small, sufficient flame retardance cannot be imparted and, if the amounts added are too large, physical properties as molded articles worsen.

(Protic Compound)

In the present invention, protic compound means a compound that donates protons (hydrogen ions).

As the protic compound in the present invention, compounds derived from a polymerization solvent of the halogenated benzyl acrylate-based flame retardant are raised as one example and the protic compound is preferably an alkoxy alcohol and more preferably a $C_1$-$C_{20}$ alkoxy $C_1$-$C_{20}$ alcohol. As the $C_1$-$C_{20}$ alkoxy $C_1$-$C_{20}$ alcohol, a methoxy $C_1$-$C_{20}$ alcohol or a $C_1$-$C_{20}$ alkoxy ethanol are more preferred and methoxyethanol is yet more preferred.

Further, as the protic compound, a $C_1$-$C_2$ dialkoxy $C_1$-$C_{20}$ alcohol is also preferred and, as the $C_1$-$C_2$ dialkoxy $C_1$-$C_2$ alcohol, 3,3-diethoxypropanol is preferred.

Moreover, as the protic compound in the present invention, a compound derived from a raw material of the halogenated benzyl acrylate-based flame retardant is raised as one example, and the protic compound is preferably an aromatic carboxylic acid and more preferably benzoic acid. As the protic compound in the present invention, a compound derived from a polymerization solvent is more preferred than that derived from a raw material of the halogenated benzyl acrylate-based flame retardant.

The amount of the protic compound contained in the halogenated benzyl acrylate-based flame retardant in the present invention is 10-1,000 ppm, but is preferably 100-800 ppm and more preferably 300-500 ppm. If the amount of the protic compound contained in the halogenated benzyl acrylate-based flame retardant is less than 10 ppm, the effect of improving fluidity of the flame-retardant polybutylene terephthalate resin composition is not readily obtained. Further, if the amount of the protic compound contained in the halogenated benzyl acrylate-based flame retardant is greater than 1,000 ppm, the amount of gas generated when compounding increases and strand breakage readily occurs when pelleting.

(Linear Low-Molecular Weight Body)

In the fame-retardant polybutylene terephthalate resin composition of the present invention, the protic compound contained by the halogenated benzyl acrylate-based flame retardant generates a linear compound which is a reactant with a linear low-molecular weight body (oligomer) of the polybutylene terephthalate resin and this is presumed to provide effects similar to those of a plasticizer and improve the fluidity of the terephthalate resin composition. Therefore, it is preferable that the polybutylene terephthalate resin contain a linear low-molecular weight body. The amount of the linear low-molecular weight body contained in the polybutylene terephthalate resin is preferably 50-1,000 ppm, more preferably 70-700 ppm, and yet more preferably 100-200 ppm. If the amount of the linear low-molecular weight body is less than 50 ppm, the effect of improved fluidity of the flame-retardant polybutylene terephthalate resin composition is not readily obtained and if the amount exceeds 1,000 ppm, mold deposits readily occur, so this is not preferred.

(Filler)

A filler can be used in the composition of the present invention, as necessary. Such a filler is preferably blended in order to obtain excellent properties in performance such as mechanical strength, thermal resistance, dimensional stability, and electrical properties and is particularly effective with the objective of increasing rigidity. In accordance with the objective, a fibrous, granular, or tabular filler is used.

As fibrous fillers, there are glass fibers, asbestos fibers, carbon fibers, silica fibers, silica/alumina fibers, zirconia fibers, boron nitride fibers, silicon nitride fibers, boron fibers, potassium titanate fibers, and further, fibrous materials of metals such as stainless steel, aluminum, titanium, copper, and brass, etc. High-melting point organic fibrous substances such as polyamides, fluorine resins, and acrylic resins can also be used.

As granular fillers, there are carbon black, quartz powder, glass beads, glass powder, silicates such as calcium silicate, aluminum silicate, kaolin, talc, clay, diatomaceous earth, and wollastonite, metal oxides such as iron oxide, titanium oxide, and alumina, metal carbonates such as calcium carbonate and magnesium carbonate, metal sulfates such as calcium sulfate and barium sulfate, and, additionally, silicon carbide, silicon nitride, boron nitride, various metal powders, etc.

Further, as tabular inorganic fillers, there are mica, glass flakes, various metal foils, etc.

The type of the filler is not particularly limited and one or more types of filler can be added. In particular, using potassium titanate fibers, mica, talc, or wollastonite is preferred.

The amount of the filler added is not particularly specified, but is preferably 200 parts by mass or less with respect to 100 parts by mass of the polybutylene terephthalate resin. When the filler is added in excess, inferior moldability and decreases in toughness are observed.

(Additives)

Furthermore, in order to impart desired properties other than flame retardance, publicly known substances generally added to thermoplastic resins and the like can be added in combination to the composition of the present invention in accordance with the objective thereof. Any of, for example, an antioxidant, an ultraviolet absorbing agent, a stabilizer such as a photostabilizer, an anti-static agent, a lubricant, a mold release agent, a colorant such as a dye or pigment, a plasticizing agent, etc. can be blended. In order to improve thermal resistance, in particular, the addition of an antioxidant is effective.

[Manufacturing Method for the Flame-Retardant Polybutylene Terephthalate Resin Composition]

The form of the flame-retardant polybutylene terephthalate resin composition of the present invention may be a granular mixture and may be a molten mixture (melt-kneaded article) such as pellets. The manufacturing method for the polybutylene terephthalate resin composition of one embodiment of the present invention is not particularly limited and the composition can be manufactured with equipment and methods known in this technical field. For example, the composition can be prepared as pellets for molding by mixing the necessary components and kneading using a single-screw or twin-screw extruder or other melt-kneading device. Multiple extruders or other melt-kneading devices may be used. Further, all the components may be simultaneously charged from a hopper or some components may be charged from a side feed port.

Moreover, the flame-retardant polybutylene terephthalate resin composition of the present invention is preferably manufactured by vacuum drying (vacuum drawing). Generally used evaporators, ovens, etc. can be used in vacuum drying.

Examples

The present invention will be explained specifically with the following examples, but the present invention is not limited by these examples so long as the gist thereof is not exceeded.

After using halogenated benzyl acrylate-based flame retardants containing protic compounds of the types and in the amounts indicated in Table 1 and polybutylene terephthalate resins containing linear low-molecular weight bodies in the amounts shown in Table 1 to weigh and blend the components in the blending amounts indicated in Table 2, melt-kneading with a TEX-30 twin-screw extruder manufactured by The Japan Steel Works, LTD. under the conditions of a cylinder temperature of 260° C., a screw rotation speed of 120 rpm, and an extrusion amount of 15 kg/hr, and extruding in strands from a die, flame-retardant polybutylene terephthalate resin compositions were obtained in pellet form by cooling and shearing. When doing so, the occurrence of strand breakage was confirmed and the compositions in which strand breakage largely did not occur were evaluated as ○ and those in which it often occurred were evaluated as x. The results are shown in Table 1.

Using the pellets of the obtained examples and comparative examples, melt fluidity, flame retardance, and mold deposits were evaluated. The results are shown in Table 1.

that could not fill the article to the top due to insufficient fluidity were evaluated as x.

2) Flame Retardance

In conformance with UL94, flame retardance was evaluated using 125 mm×13 mm×0.4 mm strip-shaped test pieces.

3) Mold Deposits

The strip-shaped test pieces used in the evaluation of flame retardance were shot molded 6,000 times in a row and evaluation was performed by visual inspection of the mold cavity surface. Cases in which mold deposits were not observed were evaluated as ○ and those in which deposits were observed were evaluated as x.

TABLE 1

| | EXAMPLES | | | | | |
|---|---|---|---|---|---|---|
| | 1 | 2 | 3 | 4 | 5 | 6 |
| TYPE OF PROTIC COMPOUND IN FLAME RETARDANT | METHOXY ETHANOL | METHOXY ETHANOL | METHOXY ETHANOL | METHOXY ETHANOL | 3,3-DIETHOXY PROPANOL | BENZOIC ACID |
| AMOUNT OF PROTIC COMPOUND IN FLAME RETARDANT (ppm)[1] | 20 | 300 | 300 | 800 | 100 | 300 |
| AMOUNT OF LINEAR LOW-DENSITY BODY IN PBT (ppm)[2] | — | 50 | 150 | — | — | — |
| STRAND BREAKAGE | ○ | ○ | ○ | ○ | ○ | ○ |
| MELT FLUIDITY[3] | ○ | ○ | ○ | ○ | ○ | ○ |
| FLAME RETARDANCE[4] | V-0 | V-0 | V-0 | V-0 | V-0 | V-0 |
| MOLD DEPOSITS[5] | ○ | ○ | ○ | ○ | ○ | ○ |

| | COMPARATIVE EXAMPLES | | | | | |
|---|---|---|---|---|---|---|
| | 1 | 2 | 3 | 4 | 5 | 6 |
| TYPE OF PROTIC COMPOUND IN FLAME RETARDANT | NONE | METHOXY ETHANOL | METHOXY ETHANOL | METHOXY ETHANOL | METHOXY ETHANOL | METHOXY ETHANOL |
| AMOUNT OF PROTIC COMPOUND IN FLAME RETARDANT (ppm)[1] | — | 300 | 300 | 5 | 1200 | 1200 |
| AMOUNT OF LINEAR LOW-DENSITY BODY IN PBT (ppm)[2] | — | 30 | 1200 | 150 | 150 | 2000 |
| STRAND BREAKAGE | ○ | ○ | ○ | ○ | x | x |
| MELT FLUIDITY[3] | x | x | ○ | x | ○ | ○ |
| FLAME RETARDANCE[4] | V-0 | V-0 | V-0 | V-0 | V-0 | V-0 |
| MOLD DEPOSITS[5] | ○ | ○ | x | ○ | ○ | x |

[1]ANALYZED WITH HEADSPACE GAS CHROMATOGRAPHY (180° C., 1 HOUR HEATING)
[2]LINEAR LOW-MOLECULAR WEIGHT BODY; SEC (SIZE-EXCLUSION CHROMATOGRAPHY)
500 μL OF INTERNAL STANDARD DMT-ADDED CHLOROFORM AND 500 μL OF HEXAFLUOROISOPROPANOL WERE ADDED TO A SAMPLE (40 mg), STIRRED, AND DISSOLVED, THEN 1 mL OF CHLOROFORM WAS ADDED (LIQUID A). 1,000 uL OF LIQUID A WAS ADDED TO 10 mL OF ACETONITRYL, REPRECIPITATED, AND THE DISSOLVED COMPONENTS ANALYZED WITH HPLC.

1) Melt Fluidity

The box-like molded article (the thickness of the four sidewalls and the bottom is 0.7 mm) shown in FIG. 1 was injection molded at a resin temperature of 260° C., a mold temperature of 60° C., an injection speed of 100 mm/s, and a holding pressure of 50 MPa and the compositions that completely filled the article were evaluated as ○ and those

TABLE 2

| | |
|---|---|
| PBT RESIN | 100 PARTS BY MASS |
| HALOGENATED BENZYL ACRYLATE-BASED FLAME | 20 PARTS BY MASS |

TABLE 2-continued

| | |
|---|---|
| RETARDANT | |
| ANTIMONY TRIOXIDE | 10 PARTS BY MASS |
| DRIP PREVENTION AGENT (POLYTETRAFLUOROETHYLENE) | 1 PART BY MASS |
| ANTIOXIDANT (HINDERED PHENOL) | 1 PART BY MASS |
| MOLD RELEASE AGENT (PE WAX) | 2 PARTS BY MASS |

The invention claimed is:

1. A flame-retardant polybutylene terephthalate resin composition containing a polybutylene terephthalate resin and
   a halogenated benzyl acrylate-based flame retardant which includes methoxyethanol, 3,3-diethoxypropanol or benzoic acid determined by headspace gas chromatography,
   wherein the amount of gas derived from the methoxyethanol, 3,3-diethoxypropanol or benzoic acid, which is generated by heating a crushed sample of the halogenated benzyl acrylate-based flame retardant for 1 hour at 180° C., is 10-1,000 ppm as measured by headspace gas chromatography,
   wherein the polybutylene terephthalate resin comprises 50-1,000 ppm of a linear low-molecular weight-body.

2. The flame-retardant polybutylene terephthalate resin composition according to claim 1, wherein the methoxyethanol, 3,3-diethoxypropanol or benzoic acid is derived from a polymerization solvent of the halogenated benzyl acrylate-based flame retardant.

3. The flame-retardant polybutylene terephthalate resin composition according to claim 1, wherein the methoxyethanol, 3,3-diethoxypropanol or benzoic acid is derived from a raw material of the halogenated benzyl acrylate-based flame retardant.

4. The flame-retardant polybutylene terephthalate resin composition according to claim 1, wherein the halogenated benzyl acrylate-based flame retardant is a brominated acrylic polymer represented by general formula (I):

[Chem. 1]

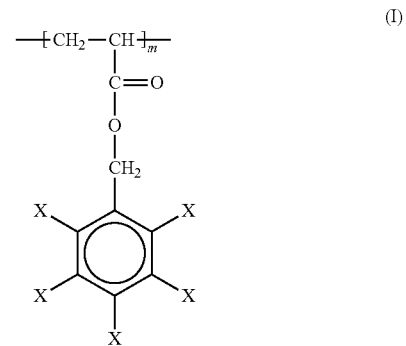

(in the formula, at least one X is bromine and m is a number from 10-2,000).

5. The flame-retardant polybutylene terephthalate resin composition according to claim 4, wherein the halogenated benzyl acrylate-based flame retardant is polypentabromobenzyl acrylate.

6. The flame-retardant polybutylene terephthalate resin composition according to claim 1, wherein the content of halogenated aromatic compounds other than the halogenated benzyl acrylate-based flame retardant in the flame-retardant polybutylene terephthalate resin composition is less than 0.5 ppm.

* * * * *